United States Patent [19]

Magrecki et al.

[11] Patent Number: 5,667,681
[45] Date of Patent: Sep. 16, 1997

[54] FLIGHT TIP EXTENSIONS FOR CENTRIFUGAL SEPARATOR

[75] Inventors: Thomas John Magrecki, St. Louis, Mo.; Jerry Dean Farmer, Eldorado, Ill.

[73] Assignee: Elgin National Industries, Inc., Downers Grove, Ill.

[21] Appl. No.: 627,106

[22] Filed: Apr. 3, 1996

[51] Int. Cl.⁶ .................. B01D 33/06; B04B 7/12
[52] U.S. Cl. .................. 210/374; 210/369; 210/373; 210/380.1; 494/36; 494/54; 494/55
[58] Field of Search .................. 210/369, 373, 210/374, 380.1; 494/52, 53, 54, 55, 36

[56] References Cited

U.S. PATENT DOCUMENTS

| | | | |
|---|---|---|---|
| 4,961,722 | 10/1990 | Taylor et al. | 210/369 |
| 5,256,289 | 10/1993 | Cope et al. | 210/369 |
| 5,380,434 | 1/1995 | Paschedag | 210/360.2 |

*Primary Examiner*—David A. Reifsynder
*Attorney, Agent, or Firm*—Paul M. Denk

[57] ABSTRACT

A vertical or horizontal centrifugal separator comprises a drive mechanism including a drive shaft. A flight assembly is attached to the drive shaft and is rotatably driven by it as is a screen assembly which includes a rotor that also is attached to the drive mechanism. The flight assembly generally has a frusto-conical central body with a plurality of spaced apart individual blades or flights aligned longitudinally on the exterior of the central body. The rotor is driven at a separate speed that the flight assembly. A perforated screen assembly is carried by the rotor and is positioned outwardly of the flight assembly. An inlet assembly is positioned above these other elements where material to be separated is fed into the separator through the inlet assembly. An improvement comprises a novel tip formed on each of the individual flights. The novel tips is disposed to cause the solid material to collect on the tips and decelerated the propulsion of the material and cause the material to be propelled from the flights over a greater surface area of the screen thereby decreasing wear of the screen.

6 Claims, 3 Drawing Sheets

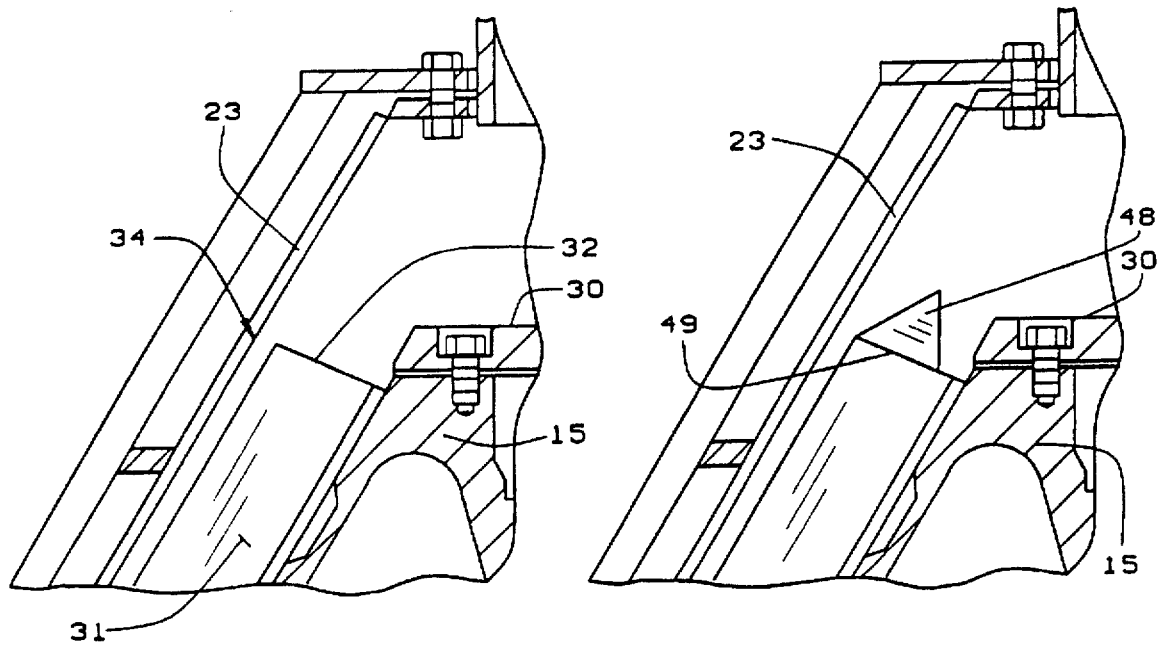
FIG. 7 PRIOR ART
FIG. 8
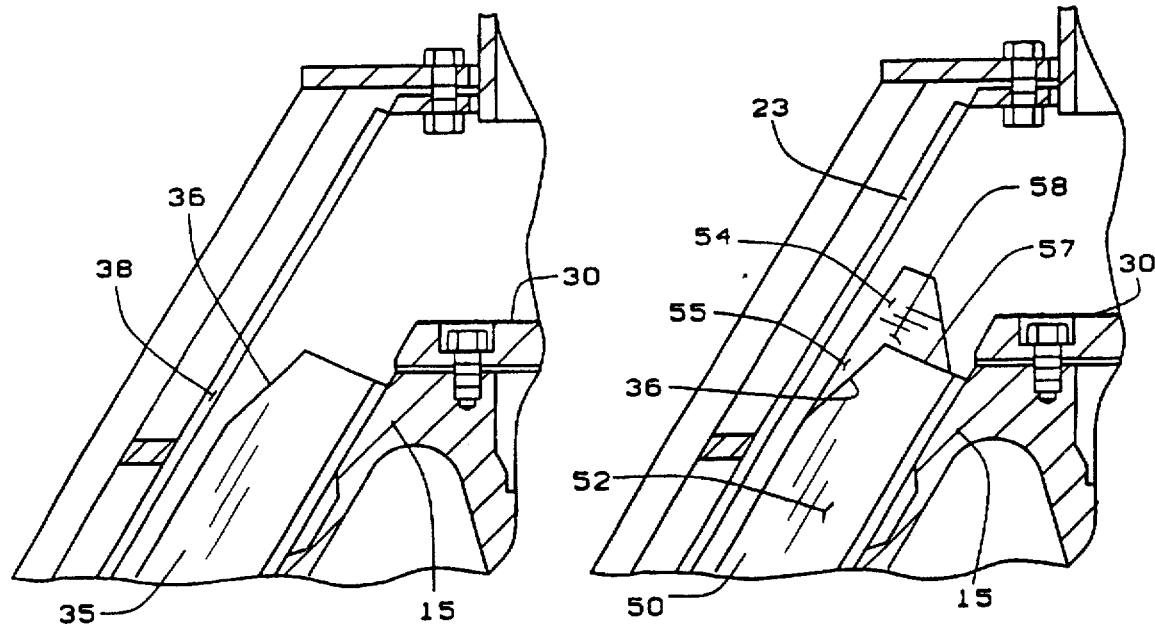
FIG. 9 PRIOR ART
FIG. 10

FLIGHT TIP EXTENSIONS FOR CENTRIFUGAL SEPARATOR

BACKGROUND OF THE INVENTION

This invention relates generally to centrifugal separators and, more particularly to improvements in flight design which extend the useful life of various components within the separator while decreeing its maintenance.

As is well known, centrifugal separators are widely used in a variety of processes in which material separation is required. Typically, material is fed into a top of the separator and is brought into contact with rotating elements within the separator. Solid material is retained near the center of the separator by perforate plate or profile bar screens while free liquids are slung through the screen by centrifugal force, to the outside of the separator. These liquids then are directed to a drain outlet and the solid material falls, by gravity, to the bottom of the separator where it is discharged for collection.

Because of the abrasive quality of the material fed into the separator, and the impact forces which are created as the material is moved through it, components within the separator are subject to rapid wear. Screens, rotors, flights, etc. all need to be replaced with such frequency that the separator has substantial down time while necessary maintenance is being performed.

The maintenance problem with centrifugal separators has long been recognized and different measures have been undertaken to address it. In U.S. Pat. No. 4,961,722, for example, a screen assembly is described having separate upper and lower portions. These portions are separate became in conventional centrifugal separators, the screen assembly projects as far upwardly within the separator housing as the flight assembly of the separator which is mounted in the screen. In use, material introduced into the separator is flung against the screen by the rotating flight assembly and then travels by gravity and centrifugal force down the flight assembly. Because of the impact forces of the material against the screen, the upper portion of the screen, which is in general horizontal alignment with the upper end of the flight assembly, rapidly becomes worn and needs frequent replacement. U.S. Pat. No. 4,961,722 discloses a separable upper and lower screen portion which facilitates replacement of the screen portion subjected to the greatest wear, thus reducing down time and maintenance costs since only part of the screen is replaced requiring limited tear down of the inner mechanism of the separator.

U.S. Pat. No. 5,256,289 discloses an improvement in a separator that includes a pocket assembly positioned between a discharge port of the material inlet assembly and the upper end of the flight assembly. The pocket extends radially outward beyond an upper end of the flight assembly. A lower end of the pocket assembly extends below the upper end of the flight assembly, and the upper end of the semen is integral with the lower end of the pocket assembly. The pocket creates a basket for catching material introduced into the separator through the inlet assembly. The pocket replaces the upper portion of the screen, which previously was used to catch this material. Since the material impacts against a sidewall of the pocket assembly rather than against the screen, the useful life of the screen is greatly extended.

Despite any improvements provided by the prior art, the screens within centrifugal separators take a tremendous beating by the solid materials flung against them during use. Attempts to improve screen life primarily have involved modifications or improvements in the screen itself. It would be useful, therefore, to take a different approach to the problem of premature or excessive screen wear by improving aspects of the flight assembly, which actually accelerates the incoming solid material to reduce impact forces and thus abrasion against the screen, in order to improve the useful life of the screen.

SUMMARY OF THE INVENTION

It is among the several objects of the invention to provide an improved flight assembly that can reduce wear on elements of a centrifugal separator.

It is another object of the present invention to provide an improved flight assembly wherein the configuration of the individual flights is improved so as to change the way material is propelled by the flight to reduce wear on other elements of the centrifugal separator.

Yet another object of the invention is to provide an improved flight assembly wherein the tips of the individual flights are modified so as to change the trajectory and velocity of solid materials striking the individual flights.

Still another object of the present invention is to provide an improved flight assembly where the tips of the individual flights are more resistant to wear than conventional flights.

Another object of the present invention to provide such an improvement in the flights that can be retrofitted easily and economically to existing flights in any commercial embodiment of a centrifugal separator containing a flight assembly.

In accordance with the invention, generally stated, a vertical or horizontal centrifugal separator comprises a corresponding drive mechanism including a drive shaft. A flight assembly is attached to the drive shaft and is rotatably driven by it, as is a screen assembly which includes a rotor that also is attached to the drive mechanism. The flight assembly generally has a frusto-conical central body with a plurality of spaced apart individual blades or flights aligned longitudinally on the exterior of the central body. The rotor is driven at a separate speed from the flight assembly. A screen is carried by the rotor and is positioned outwardly of the flight assembly. An inlet assembly is positioned above these other elements where material to be separated is fed into the separator through the inlet assembly. This material is captured between the flight assembly and the screen and it is in this area that the initiation of material separation occurs. An improvement comprises a novel tip formed on each of the individual flights. The location of the improved flight tips, at the upper end of the flights between the screen and the cone cap, is at a location where the material is flung off of the cone cap, as it enters into and through the feed spout, and also provides for an accumulation of the material at the position of the newly added flights tips, which accumulation further acts as a cushion against which subsequently added material may impact, thereby reducing the incidence of abrasion to the screen itself. The novel tips cause the solid material to be propelled from the flights over a greater surface area of the screen, i.e. the tips cause the material to strike the screen above the flight as well as parallel to the flight. By increasing the surface area of the screen contacted by the solid material, wear is decreased. In addition, the flight tips serve as material accelerators to bring the incoming material up to or near to the speed of the screen as it deposits material thereon, thus decreasing screen abrasion. The flight tip extensions have increased screen life by 80% to over 300% of expected screen life. The flight tips can be integrally formed on the flights during manufacturing or can be retro fitted to the upper edge of an existing flight by welding or other appropriate means. Further, the novel flight tips are configured to be more resistant to wear.

BRIEF DESCRIPTION OF THE DRAWINGS

FIG. 7 is a partial cross-sectional, front elevation of a vertical centrifugal separator illustrating a prior art flight;

FIG. 8 is a partial cross-sectional, front elevation of a vertical centrifugal separator employing an improved flight of the present invention;

FIG. 9 is a partial cross-sectional, front elevation of a vertical centrifugal separator illustrating another embodiment of a prior art flight; and FIG. 10 is a partial cross-sectional, front elevation of a vertical centrifugal separator illustrating another embodiment of an improved flight of the present invention.

Corresponding reference figures indicate corresponding structures throughout the various illustrations.

DESCRIPTION OF THE PREFERRED EMBODIMENT

Figure 1:
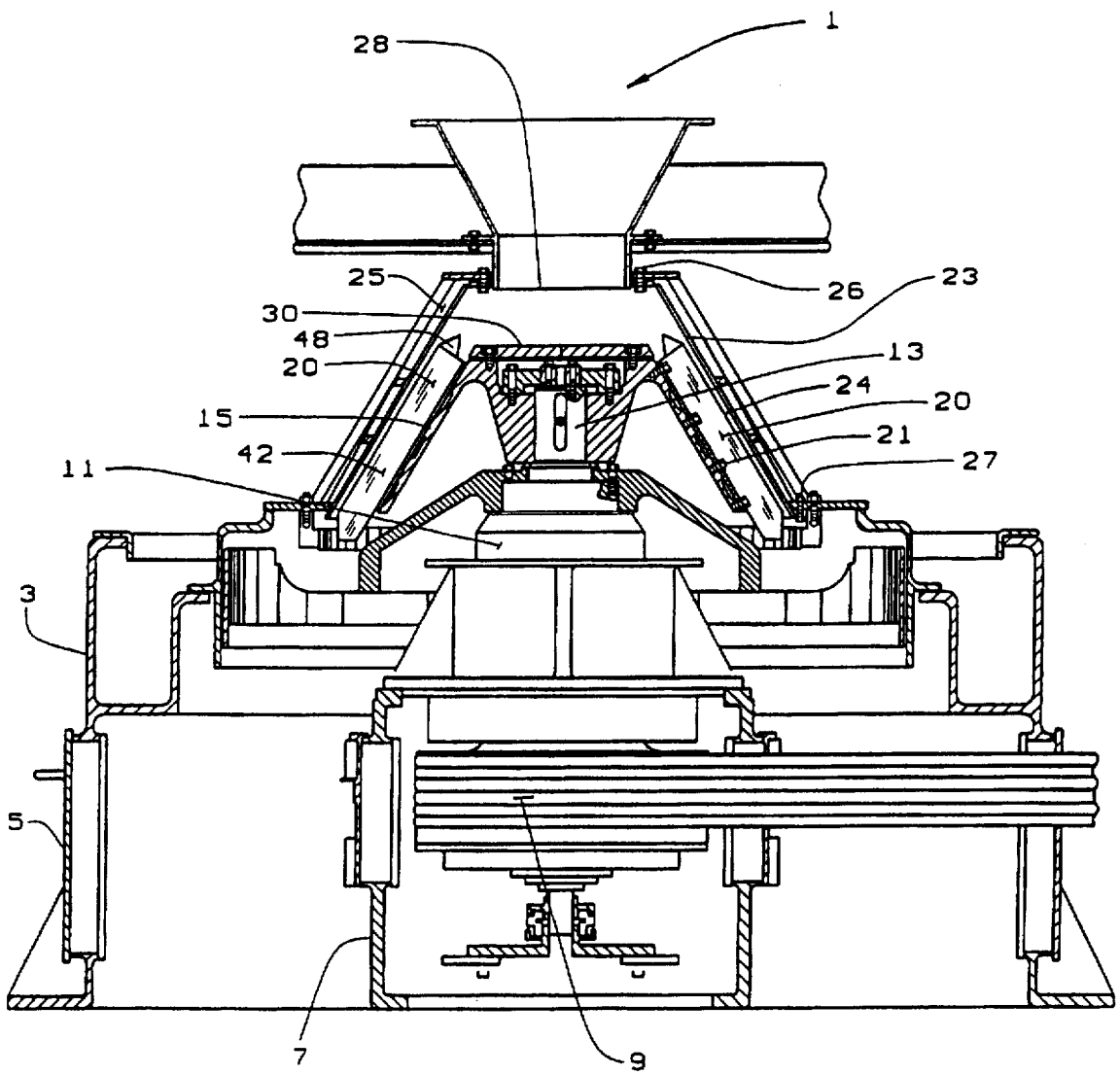
FIG. 1 is a cross-sectional, front elevation of a vertical centrifugal separator employing the improved flight tips of the present invention.

In referring to the drawings, in particular FIG. 1, there is disclosed a centrifugal separator of the present invention shown generally at 1. Separator 1 is of a generally conventional design having a main base 3 having a drive housing 7 therein. Drive housing 7 covers a conventional belt or other drive assembly, shown generally at 9.

A conventional gear assembly 11 is mounted above drive assembly 9. A rotatable vertical drive shaft 13 extends out of and is operably connected to gear assembly 11. Hollow frustrum or cone 15 is attached to shaft 13 and rotates therewith. A plurality of wiping flights of the present invention 20 are attached, as with bolts 21 or other appropriate attachment means, around cone 15. The cone 15 together with the flights 20 attached thereto constitute what will be referred to hereinafter as the flight assembly. A perforated plate or profile rod frusto-conical screen 23 is attached to and surrounds cone 15 leaving a space between the flights and the screen. There is an inlet assembly 28 by which material to be separated is fed into the separator. The inlet assembly is bolted to the top of the separator and has a spout 26 extending down inside the housing. Positioned beneath an assembly 28 of the spout is a plate 30 which is rotated via the drive assembly. Material falling through the inlet strikes the rotating plate and is thrown off by centrifugal force. Some of the material strikes the tips of the flights, which may protrude above the level of the plate. Generally the material strikes the screen at a point adjacent to the plate causing excessive wear on the screen at that point as will be explained below. In any event, the solid material falls between the screen and flight assembly. As the material travels down the flights 20, the free liquid is slung outwardly through the openings in the screen, strikes the inner wall of the housing and is directed off through a drain system.

From the foregoing it can be seen that there are many points within the separator 1 at which wear or impact damage may be caused. For example, the upper end of the screen is subject to a constant barrage of solid material which rend the screen. The upper ends of the flights also are subject to constant impacts. FIGS. 7 and 9 illustrate points of wear found with two prior art flight designs. FIG. 7 illustrates a prior art flight 31 having a generally blunt or flat upper tip 32. As can be seen, an area 34 of excessive screen wear is created on the screen 23 adjacent the tip 32 of the flight, an area which is in substantial alignment with plate 30. The tip 32 may extend, at least slightly, above the plate and, therefore, the exposed upper edge is subjected to pummeling by the solid material.

FIG. 9 illustrates another embodiment of a prior art flight 35. Flight 35 has chamfered corner 36 which creates an area 38 of wear that is somewhat greater in surface area than area 34 as described above in relation to the other prior art embodiment. Having a greater surface area 38 makes wear less acute, however, the prior art flight 35 design still promotes screen wear.

Figure 2:
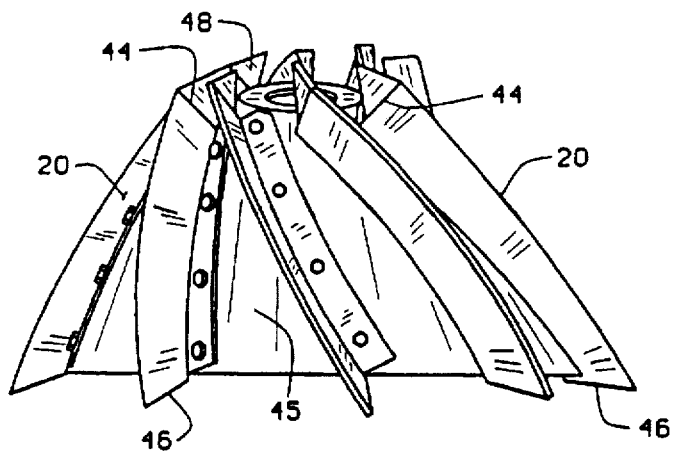
FIG. 2 is a side elevational view of the flight assembly of a vertical centrifugal separator, the individual flights employing the improved flight tips of the present invention.
Figure 3:
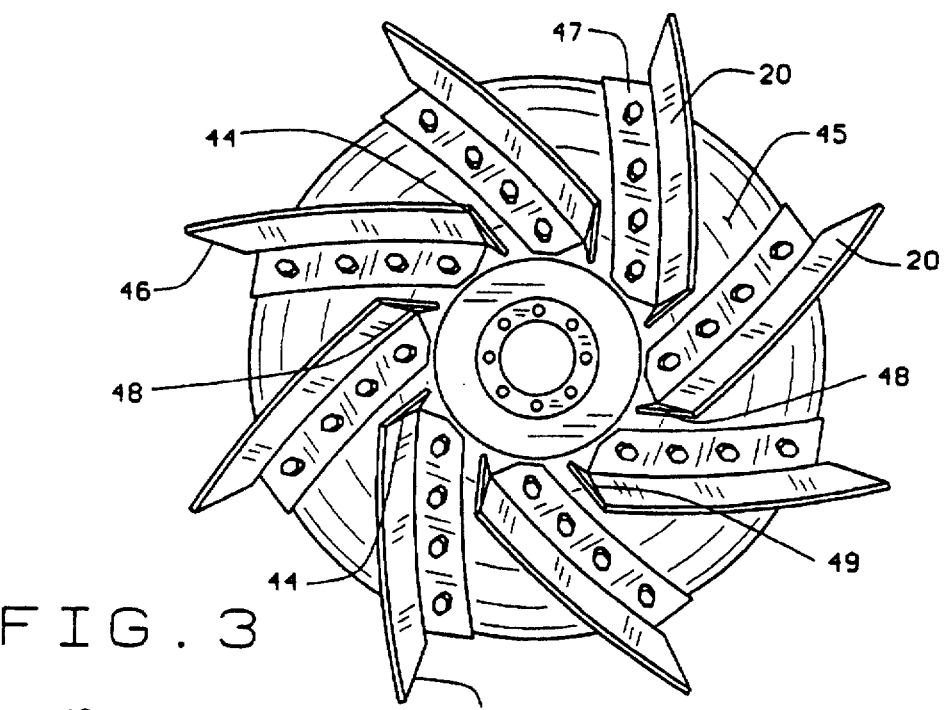
FIG. 3 is a top plan thereof.
Figure 4:
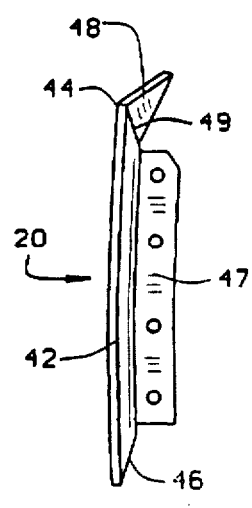
FIG. 4 is a front elevational view of an improved flight of the present invention.
Figure 5:
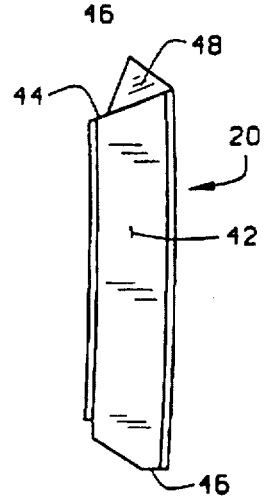
FIG. 5 is a side elevational view thereof.
Figure 6:
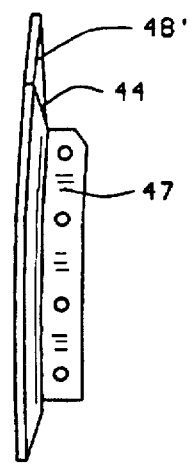
FIG. 6 is a front elevational view of another embodiment of an improved flight of the present invention.

FIGS. 2–5 and 8 show in greater detail the improved flight 20 of the present which reduces screen wear. Flight 20 is a novel improvement over the prior art flight 31 shown in FIG. 7. As shown in FIGS. 2 and 3, the flight assembly comprises the central body or cone 15. A plurality of flights 20 are attached to an extend substantially vertically on the surface of cone 15. The individual flight 20 has a flat, elongated body 42 having a first or upper end 44 and a second or bottom end 46. There is mounting flange 47, with holes, at a right angle to the body for attaching the flight to the cone. It will be appreciated that body 42 has a subtle curvature along its length from first end 44 down to the second end 46. Moreover, as seen in FIGS. 2 and 5, flight 20 is slightly outwardly bowed along its horizontal axis so as to conform to the curvature of cone 15. There is a tip 48 formed on upper end 44 of the flight. Tip 48 is substantially triangular and has a relatively sharp point. Tip 48 can be formed at an angle relative to the longitudinal axis of body 42, as shown in FIGS. 2–5 or, alternatively, can be formed substantially co-planar to body 42, as indicated generally by reference numeral 48' in FIG. 6. The angles at which the tip is formed affect the wear of the various elements and will be explained in greater detail below.

In any event, tip 48 performs several novel functions. First, since the tip extends above the plate 30, projected solid material first strikes a substantially portion of tip 48 before striking the screen. Tip 48, therefore, slows the trajectory of the solid material and lessens the impact on the screen 23. Also, as shown in FIG. 8, tip 48 protrudes above the plate thereby directing solid material higher up on the screen. By increasing the surface area over which the solid material is projected, wear is spread over a greater area and the screens do not wear through as rapidly. Moreover, the tips, particularly the angled tip 48, collects solid material in the crease 49 where tip 48 and upper end 44 join. Tip 48 can been set at any angle relative to the body that improves screen or flight life, ordinarily anywhere from −5° to +5°. Since projected solid material tends to build up in the crease, there is a slow down in the rate at which material strikes the screen. Further, the built-up material forms a barrier to protect the upper end of the flight. In the embodiment of tip 48' (FIG. 6) there is no distinct crease to function like a pocket to collect material. However, some material will stick to tip 48'. Moreover, since the tip 48' is not at an angle, it extends above the plate higher than does tip 48 and, therefore, deflects solid material higher up on the screen.

FIG. 10 shows another embodiment of a flight of the present invention, the flight indicated generally be reference numeral 50. As will be appreciated, flight 50 is a novel improvement over the prior art flight 35 previously discussed. Flight 50 has a body 52 which is substantially similar to the body of flight 35. However, the upper end employs a novel tip 54. The tip can be set co-planer to the body or at a +5 or −5 degree angle. Tip 54 has a substantially frusto-pyramidal shape, with one elongated side that mates with and eliminates chamfered corner 36. As can be appreciated, tip 54 extends above plate 30 and substantially increases the surface area of the primary wear area on the screen. There is a substantially inverted V-shaped crease 57 at the juncture of tip 54 and the flight. Crease 57 forms a slight pocket 58 in the upper end of the flight for capturing material propelled from plate 30.

A tip 48 or 54 set at a −5° angle exhibited accelerated flight wear, especially at crease 49, and flight life decreased 40 to 50 hour per set. However, screen life increased to 480 to 590 hours, as substantial, and counterbalancing improvement. Tips set at a +5° angle also extended screen life, but the screens wore in the normal wear pattern as exhibited in FIG. 7. The 0° tip, e.g., tip 48', increases screen life to the range of 480 to 590 hours but also increases flight life approximately 35% to 40% over that of the prior art. Other tests have shown an increase in screen life of approximately for tip 48 of approximately 80% and an increase in screen life for tip 54 of greater than 300%.

The previously described improved flights can be provided as an integral unit with the respective flight tips integrally formed or the upper ends. On the other hand, the respective tips can be formed separately and welded or bolted on the upper end of the prior art flights. In any event, the improved flights increase screen life and reduce maintenance costs and down time.

It will be appreciated that various changes and modifications may be made in the improved flights of the present invention without departing from the scope of the appended claims. Therefore, the foregoing description and accompanying drawings are intended to be illustrative only and should not be construed in a limiting sense.

We claim:

1. A centrifugal separator comprising:

a drive mechanism including a drive shaft;

a flight assembly attached to the drive shaft and rotatably driven by it;

a screen assembly which includes a rotor and also is attached to the drive mechanism;

a flight assembly having a frusto-conical central body and a plurality of spaced apart individual blades or flights aligned longitudinally on the exterior of the central body;

an extension tip formed on each of the individual flights, the extension tips disposed to cause solid material to be propelled from the flights over a greater surface area of the screen so as to alter a wear pattern of the screen and increase screen life;

said extension tips being secured to one end of each of the individual flights, and said extension tips being unconnected to any other part of the flight assembly and screen assembly;

the extension tips of the flight assembly are positioned at an angle relative to the flight of approximately −5° to approximately +5°; and said screen assembly being carded by the rotor and is positioned outwardly of the flight assembly.

2. The improvement of claim 1 wherein the extension tip extends substantially above the top of the central body of the flight assembly.

3. The centrifugal separator of claim 1 wherein the extension tips are retrofitted to the flights.

4. The improvement of claim 1 wherein the extension tip formed on each of the individual flights having a substantially triangular configuration.

5. The improvement of claim 3 wherein the extension tips are welded to the flights.

6. The improvement of claim 1 wherein the extension tips formed on each of the individual flights having a substantially frusto-pyramidal configuration.

* * * * *

UNITED STATES PATENT AND TRADEMARK OFFICE
CERTIFICATE OF CORRECTION

PATENT NO. : 5,667,681
DATED      : September 16, 1997
INVENTOR(S) : Thomas John Magrecki, et al.

It is certified that error appears in the above-identified patent and that said Letters Patent is hereby corrected as shown below:

Column 6, claim 1, line 24, change "carded" to ---carried---.

Signed and Sealed this

Twenty-fifth Day of November, 1997

Attest:

BRUCE LEHMAN

Attesting Officer

Commissioner of Patents and Trademarks